Sept. 20, 1938.  A. H. MITTAG  2,130,890
STARTING OF THYRATRON MOTORS
Filed April 27, 1937
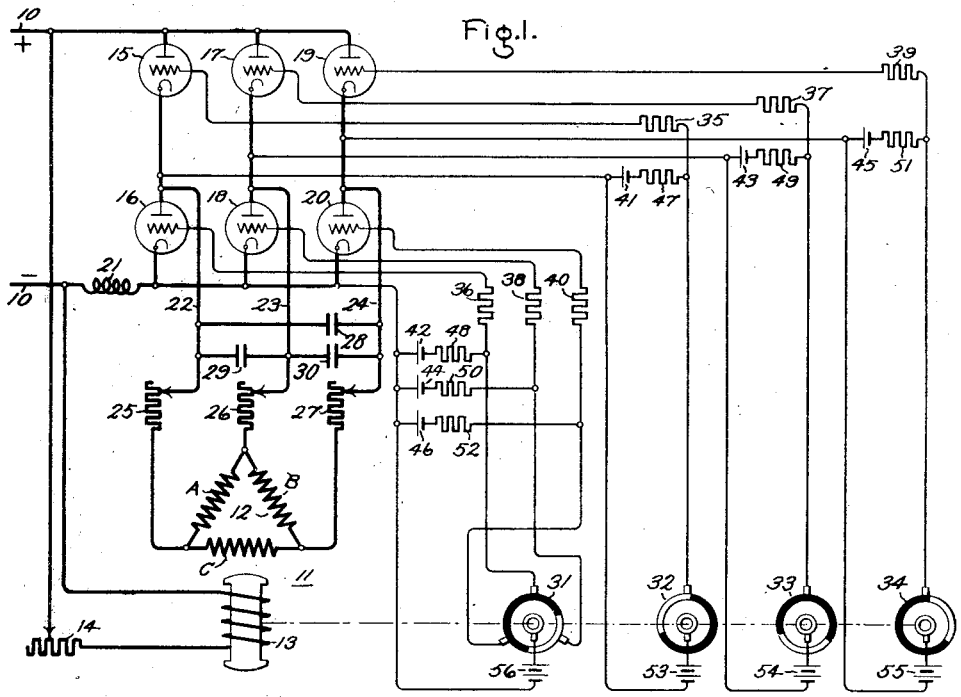
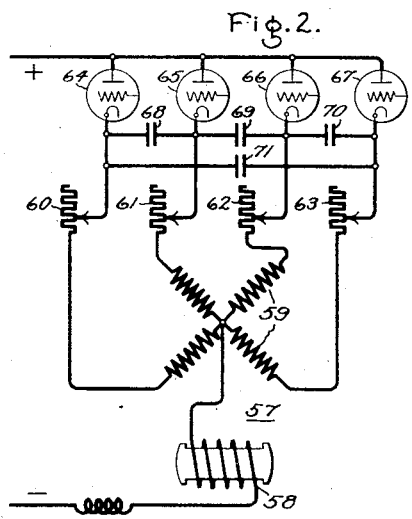
Inventor:
Albert H. Mittag,
by Harry E. Dunham
His Attorney.

Patented Sept. 20, 1938

2,130,890

UNITED STATES PATENT OFFICE 2,130,890

STARTING OF THYRATRON MOTORS

Albert H. Mittag, Schenectady, N. Y., assignor to General Electric Company, a corporation of New York Application April 27, 1937, Serial No. 139,176

8 Claims. (Cl. 171—228)

My invention relates to motors operated from a source of direct current through a plurality of electric valves, and more particularly to an arrangement for starting such motors.

Heretofore there have been proposed numerous arrangements including electric valves for operating electric motors from a direct current circuit. In such arrangements, however, particularly at the starting and low speed of the motor, the motor does not develop sufficient counter-electromotive force to produce the necessary commutation of current between the valves. It is therefore necessary to supply this commutating potential from some source or some means for generating this potential. One method of and apparatus for starting and operating electric motors is disclosed in the Willis et al. Patent No. 1,995,876, assigned to the same assignee as the present application. The arrangement disclosed in this patent utilizes static means for supplying the necessary commutating potential and it is to this type of means that my invention is directed.

It is, therefore, an object of my invention to provide an improved and simplified arrangement utilizing static means for supplying the necessary commutating voltage during the starting and low speed period of valve controlled electric motors.

For a better understanding of my invention, together with other and further objects thereof, reference is had to the following description taken in connection with the accompanying drawing, and its scope will be pointed out in the appended claims. Fig. 1 of the accompanying drawing illustrates an arrangement for operating a synchronous type motor as a full wave motor directly from a source of direct current; and Fig. 2 illustrates an arrangement for operating a four-phase half-wave motor of the synchronous type directly from a source of direct current.

Referring now to the drawing, there is illustrated in Fig. 1 an arrangement for operating from the direct current source 10 a synchronous type alternating current motor 11. The motor 11 comprises, in the arrangement shown, a three-phase delta-connected armature 12 and a rotating field winding 13, although it will be obvious to those skilled in the art that either the armature or field winding may be made the rotating member. If the direct current circuit 10 is of the proper voltage the field winding 13 may be energized directly therefrom through a control resistor 14. Obviously, of course, this field winding could also be energized from a separate source of current. The armature windings 12 are energized through a plurality of pairs of electric valves 15, 16; 17, 18; and 19, 20; these valves may be any of the several types well known in the art, although I prefer to use valves containing an ionizable medium and which are provided with a control or starting electrode. Each pair of electric valves is connected directly across the direct current circuit 10, and a reactor 21 may be connected between these valves and one side of the direct current circuit so as to prevent any undesired interaction between the circuit 10 and the valves. Each of the alternating current conductors 22, 23, 24, is connected to a point intermediate the pair of valves associated therewith. In the arrangement shown the conductors 22, 23, 24, are each connected to a different one of the adjustable starting resistors 25, 26, 27, which are connected to the terminals of armature phase winding 12. Between each of the conductors 22, 23, 24, there is connected one of the capacitors 28, 29 and 30, which supply a commutating voltage to transfer the current between the electric valves. While the capacitors have been shown arranged in a delta connection it will be apparent that they could be arranged in a star connection. The grids or control electrodes of the several electric valves, 15 to 20, inclusive, are arranged to be excited through a suitable control circuit. This control circuit may be any of those commonly utilized in the art and the arrangement shown in Fig. 1 merely illustrates the sequence in which these valves are to be rendered conductive. These electric valves are rendered conductive in accordance with the speed of the motor by means of a plurality of distributors 31 to 34, mounted upon the shaft of the motor 11. Each of the grid circuits of the valves 15 to 20 contains current limiting resistors 35 to 40, respectively, a source of negative biasing potential 41 to 46, respectively, and a biasing resistor 47 to 52, respectively. Each of the grids of the electric valves 15, 17 and 19 is connected to the brushes of the distributors 32 to 34, respectively. The cathodes of each of these valves 15, 17 and 19 are connected through the batteries 53, 54 and 55, respectively, to the conducting segments of the distributors 32 to 34, respectively. Each of the grids of the electric valves 16, 18 and 20 is connected to a different one of the brushes of the distributor 31 and the cathodes of all these devices having a common potential, are connected through the battery 56 to the live segment of the distributor 31.

In explaining the operation of the above-described apparatus, it will be assumed that the motor rotor 13 is in the position indicated in the drawing, and that the direction of the rotation is clockwise. Under these conditions, it is seen that positive bias has been impressed upon the electric valve 18 by means of the battery 56 through the distributor segments of the distributor 31. Likewise it will be seen that electric valve 15 has just been rendered conductive by the application of positive potential from the battery 53 through the conducting segment of the distributor 32. At the time of the starting of the motor all of the resistors 25 to 27 are connected in series with the armature winding so that current now flows from electric valve 15 through resistor 25, phase winding 12A, resistor 26 and electric valve 18. During the latter half of the period of the conductivity of electric valve 15 current will flow from this valve through resistor 25, armature winding 12C, resistor 27 and electric valve 20. During the latter period of conductivity of electric valve 18 capacitors 28 to 30 have been charging to a potential sufficient to transfer current from this valve to valve 20. Likewise, during the latter period of conductivity of the electric valve 15 capacitors 28 to 30 are being charged to such potential as to transfer the current from valve 15 to valve 17. As the motor comes up to speed the resistors 25 to 27 are gradually cut out and when the motor has finally reached sufficient speed the electromotive force induced in the several phase windings of the armature 12 by the field winding 13 is sufficient to commutate the current between several electric valves.

The arrangement shown in Fig. 2 discloses a quarter-phase half-wave motor 57 having a field winding 58 and a group of armature windings 59. Each of the armature windings is provided with an adjustable resistor 60 to 63, inclusive. If the torque characteristics of the series type D. C. motors are desired the field winding 58 may be connected between the neutral points of the armature winding 59 and one side of the direct current circuit. The other side of the direct current circuit is connected through the valves 64 to 67 to the adjustable resistors 60 to 63, respectively. The capacitors 68 to 71 are connected between different ones of said electric valves. The conductivity of electric valves 64 to 67 is controlled in accordance with the speed of the field winding 58 by a circuit operating in a manner similar to the grid control circuit disclosed in Fig. 1.

While the arrangement disclosed in Fig. 1 shows the armature phase winding 12 connected in a delta arrangement it will be understood, by those skilled in the art, that these phase windings could also be arranged in a star connected arrangement similar to that disclosed in Fig. 2. In some instances the star connected arrangement may have an advantage since during the conductivity of any pair of electric valves the current is transmitted through two of the armature phase windings 12.

While I have shown and described my invention in connection with certain specific embodiments, it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States, is:—

1. An arrangement for starting an electric motor provided with a plurality of inductive windings from a source of direct current comprising a plurality of electric valves interconnecting said windings with said source, a plurality of commutating capacitors each connected between different ones of said valves, and a plurality of adjustable impedance devices each connected between one of said windings and said valves.

2. An arrangement for starting an electric motor provided with a plurality of inductive windings from a source of direct current comprising a plurality of controlled electric valves interconnecting said windings with said source, a plurality of commutating capacitors each connected between different ones of said valves, a plurality of adjustable impedance devices each connected between one of said motor windings and said valves, and means for controlling the conductivities of said valves.

3. An arrangement for starting an electric motor provided with a plurality of inductive windings from a source of direct current comprising a plurality of pairs of controlled electric valves interconnecting said windings with said source, a plurality of commutating capacitors connected between said pairs of valves, a plurality of adjustable impedance devices each connected between one of said motor windings and said commutating capacitors, and means for controlling the conductivities of said valves.

4. The combination of an electric motor provided with a plurality of inductive windings, a source of direct current, a plurality of pairs of controlled electric valves for supplying alternating current to said windings, said valves interconnecting said windings with said source, a plurality of capacitors connected between said pairs of valves for supplying commutating potentials thereto, a plurality of adjustable impedance devices connected between said motor windings and said valves, and means responsive to the speed of said motor for controlling the conductivities of said valves.

5. An arrangement for starting an electric motor from a source of direct current comprising the combination of an electric motor provided with a field winding and a plurality of inductive windings arranged in star relation with the neutral thereof connected through said field winding to one side of said direct current source, a controlled electric valve for each winding interconnecting said winding with said direct current source, a capacitor for each valve, said capacitors interconnecting said valves to supply commutating potentials thereto, an adjustable impedance device for each winding connected between said winding and its associated valve, and means for controlling the conductivities of said valves.

6. The combination comprising a source of direct current, a polyphase electric motor provided with a plurality of inductive windings, an adjustable impedance device for each of said inductive windings, a plurality of conductors each connected to one of said adjustable impedance devices, a plurality of capacitors arranged in a polyphase network and each being connected between different pairs of said conductors, a plurality of pairs of electric valves arranged directly in series relation across said direct current source, means connecting each of said conductors to a point intermediate one of said pairs of valves, and means for controlling the conductivities of said valves.

7. The combination comprising a source of direct current, an electric motor provided with a plurality of inductive windings, a pair of electric valves for each of said windings, said pairs of electric valves being connected directly across said direct current circuit, a plurality of adjustable impedance devices each connected between one of said windings and a point intermediate said one of said pairs of valves, a plurality of capacitors, one terminal of each capacitor being connected at a different one of said intermediate points between said pairs of electric valves, and means responsive to the speed of said motor for controlling the conductivities of said valves.

8. The combination comprising a source of direct current, an electric motor provided with a plurality of inductive windings arranged in star relation, means connecting the neutral of said inductive windings to one side of said direct current source, a plurality of adjustable impedance devices each connected to a different terminal of said inductive windings, a plurality of controlled electric valves each connected between the other side of said direct current source and said adjustable impedance devices, and a plurality of capacitors connected between the valves of adjacent inductive windings so as to provide commutating potentials thereby to permit the starting of said motor directly from said direct current source by adjustment of said adjustable impedance devices.

ALBERT H. MITTAG.